(12) United States Patent
Barksdale et al.

(10) Patent No.: US 6,661,436 B2
(45) Date of Patent: Dec. 9, 2003

(54) METHOD FOR PROVIDING WINDOW SNAP CONTROL FOR A SPLIT SCREEN COMPUTER PROGRAM GUI

(75) Inventors: Molly K. Barksdale, Austin, TX (US); Bethany L. Kessen, Apex, NC (US); Martin T. Moore, Durham, NC (US); Jason C. Plurad, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 09/732,269

(22) Filed: Dec. 7, 2000

(65) Prior Publication Data

US 2002/0070974 A1 Jun. 13, 2002

(51) Int. Cl.[7] .................................................. G09G 5/00
(52) U.S. Cl. ....................... 345/788; 345/792; 345/798; 345/799; 345/800
(58) Field of Search .................... 345/788, 792, 345/798, 799, 800, 806, 807, 781, 783

(56) References Cited

U.S. PATENT DOCUMENTS

| | | | | |
|---|---|---|---|---|
| 5,704,050 A | * | 12/1997 | Redpath ...................... | 345/764 |
| 5,808,610 A | * | 9/1998 | Benson et al. .............. | 345/788 |
| 5,883,626 A | * | 3/1999 | Glaser et al. ................ | 345/788 |
| 6,166,736 A | * | 12/2000 | Hugh .......................... | 345/798 |
| 6,195,094 B1 | * | 2/2001 | Celebiler .................... | 345/764 |

* cited by examiner

Primary Examiner—Ba Huynh
(74) Attorney, Agent, or Firm—Cardinal Law Group; Robert M. Carwell (57) ABSTRACT

A method for window snap control for a split screen computer program GUI is provided. In the method, an area between a first and second display windows of a computer program is selected. The selected area activates a snap function of the computer program. The snap function displays a selection icon for client interaction with a selection indicator within the selection icon. Selecting the indicator will increase a size of the first display window while simultaneously decreasing a size of the second display window.

20 Claims, 7 Drawing Sheets

METHOD FOR PROVIDING WINDOW SNAP CONTROL FOR A SPLIT SCREEN COMPUTER PROGRAM GUI

BACKGROUND OF THE INVENTION

A client running a computer program within an operating systems graphical user interface is provided the computer programs functionality through displayed illustrations. The computer programs displayed illustrations are shown on a desktop provided by the operating system as is in the art. Often a computer program will utilize customized areas for viewing text, files, objects, or other information as these items are manipulated by the client utilizing the computer programs functions. The customized areas are often constructed as display windows as is known in the art, which provide a uniform appearance and operation between different computer programs. Though many functional tools and window features are available within a display window, a window resizing function known as a snap function is most associated with the common use of display windows.

The snap function allows a client to quickly maximize the space afforded to a particular display window within a computer programs (or applications) desktop. The desktop is the total viewable area provided for the display windows. An example of these terms are seen in Microsoft's "Windows Explorer" in which the drive, folder, and file locations are shown in one display window, while content and file information is shown in another display window. Both of these windows comprise the desktop for "Windows Explorer". The area between the display windows is known as a pane.

Snap functions typically appear across a pane as a two headed arrow. By clicking on the arrow facing the desired display window, the desired display window size "snaps" to the next logical stopping point in the desktop. Often this is the full extent possible allowing the desired display window to be viewed in the full desktop, and the opposing display window is kept in a background state until requested by the client.

The same results of the snap function can be achieved by clicking on the edge of a pane and dragging the edge while holding a specified mouse button down. The extent of resizing is controlled by the client. Both of these functions are helpful to the client and are included in many applications. The disadvantage of the current snap and dragging functions is that the user is distracted by each functions control arrows always existing visually on the client screen. In addition, the pane between the display windows can be overly obvious, appearing visually complex to the client due to the increased size required to display the control arrows.

Thus, there is a need for a method for providing window snap control for a split screen computer program GUI that that improves upon the existing art.

FIELD OF THE INVENTION

The present invention generally relates to computer programs and more particularly, to an improved technique snap controllability for split screen graphical user interface (GUI) applications within a computer program.

SUMMARY OF THE INVENTION

One aspect of the present invention provides a method for providing window snap control for a split screen computer program graphic user interface (GUI). An area between a first and second window of a computer program is selected. A snap function is activated within the selected area and a selection icon is displayed as a product of the snap function. An indicator within the selection icon is selected to increase a size of the first window while decreasing a size of the second window.

The snap function may be activated by an address association within the selected area or by positioning a cursor to the area between the first and second windows. The cursor may be positioned at a point away from the selected area to remove the selection icon from display and the display of the selection icon may be determined as a function of a position of the cursor along the selected area. The snap function increases the size of the first window to a predetermined maximum viewable size while decreasing the size of the second window to a predetermined minimum viewable size. A manual resizing function may be activated in unison with the snap function, which allows the cursor to variably resize the first and second windows variably. The selection icon may be positioned at an endpoint of the selected area. The endpoint may be at a base end of a vertical area between the first and second windows, at a top end of a vertical area between the first and second windows, at a left end of a horizontal area between the first and second windows or at a right end of a horizontal area between the first and second windows. The selection icon may be restricted to a one-window indication when one window is viewed at a maximum size.

Another aspect of the present invention provides a method for providing window snap control for a split screen computer program GUI. An area between a first and a second window of a computer program is selected. A geometric orientation of the selected area is determined and a snap function is activated within the selected area as a function of the geometric orientation. A selection icon is displayed as a product of the snap function. An indicator within the selection icon is selected to increase a size of the first window while decreasing a size of the second window.

Another aspect of the present invention provides computer program product in a computer usable medium comprising means for selecting an area between a first and second windows of a computer program, means for activating a snap function within the selected area, means for displaying a selection icon as a product of the snap function and means for selecting an indicator within the selection icon to increase a size of the first window while simultaneously decreasing a size of the second window. The program may also include means for positioning a cursor at a point away from the selected area to remove the selection icon from display. The program may also include means for determining a display of the selection icon as a function of a position of the cursor along the selected area.

Another aspect of the present invention provides computer program product in a computer usable medium, comprising means for selecting an area between a first and second windows of a computer program, means for determining a geometric orientation of the area between a first and second windows, means for activating a snap function within the selected area as a function of the geometric orientation, means for displaying a selection icon as a product of the snap function and means for selecting an indicator within the selection icon to increase a size of the first window while simultaneously decreasing a size of the second window. The program may also include activating a manual resizing function in unison with the snap function.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 1 is a flow chart representation of a preferred embodiment for providing window snap control for a split screen computer program GUI in accordance with the present invention;

FIG. 2 is an illustration of a selected area within the computer program graphical user interface of FIG. 1;

FIG. 3 is an illustration of a of a selection indicator within the selected area of FIG. 2;

FIG. 4 is a flow chart representation of a preferred embodiment for determining vertical and horizontal split screens in accordance with the present invention;

FIG. 5 is an illustration of a selection icon in accordance with the present invention;

FIG. 6 is a flow chart representation of a preferred embodiment for selection icon choices in accordance with the present invention;

FIG. 7 is an illustration of a chosen selection icon in accordance with the present invention;

FIG. 8 is an illustration of a chosen selection icon in accordance with the present invention; and FIG. 9 is a flow chart representation of a preferred embodiment for selection icon visibility in accordance with the present invention.

DETAILED DESCRIPTION OF THE PRESENTLY PREFERRED EMBODIMENTS

Figure 1:
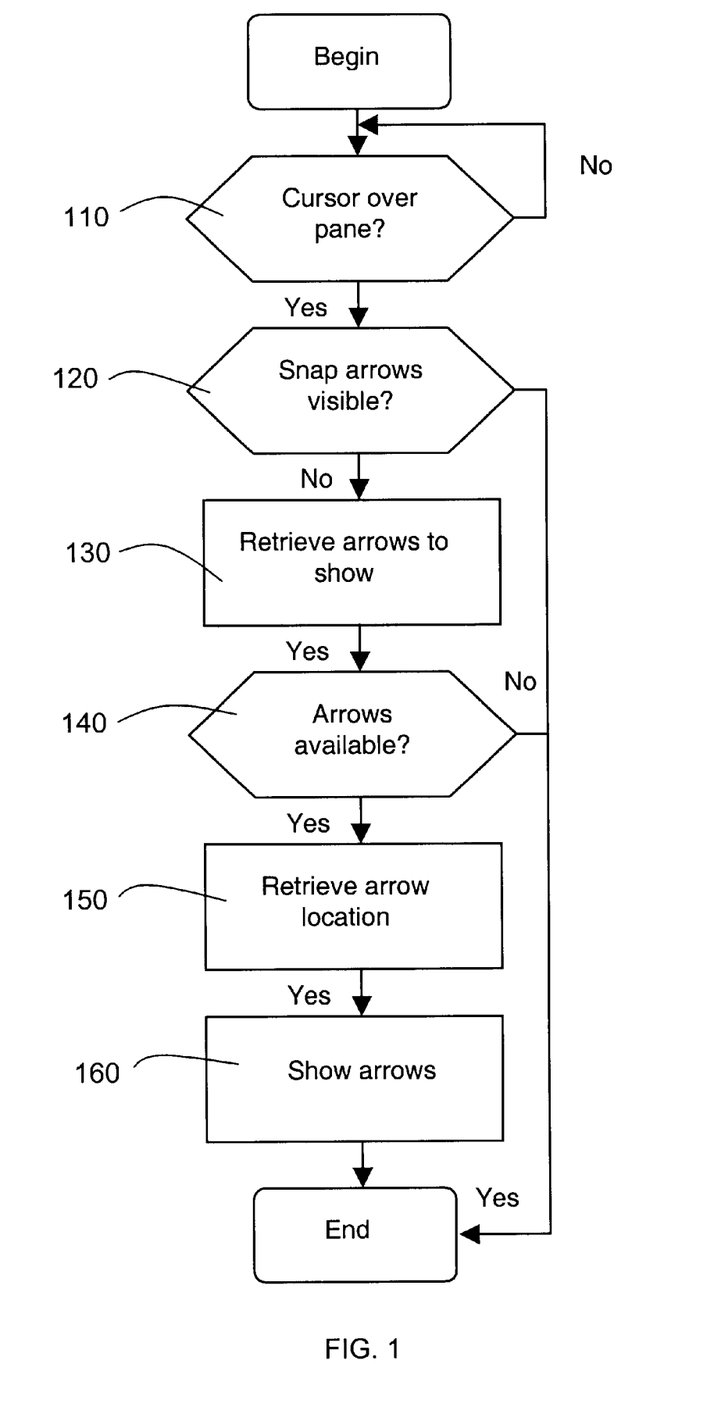
FIG. 1 is a flow diagram of one embodiment of a method for providing window snap control for a split screen computer program GUI in accordance with the present invention.
Figure 2:
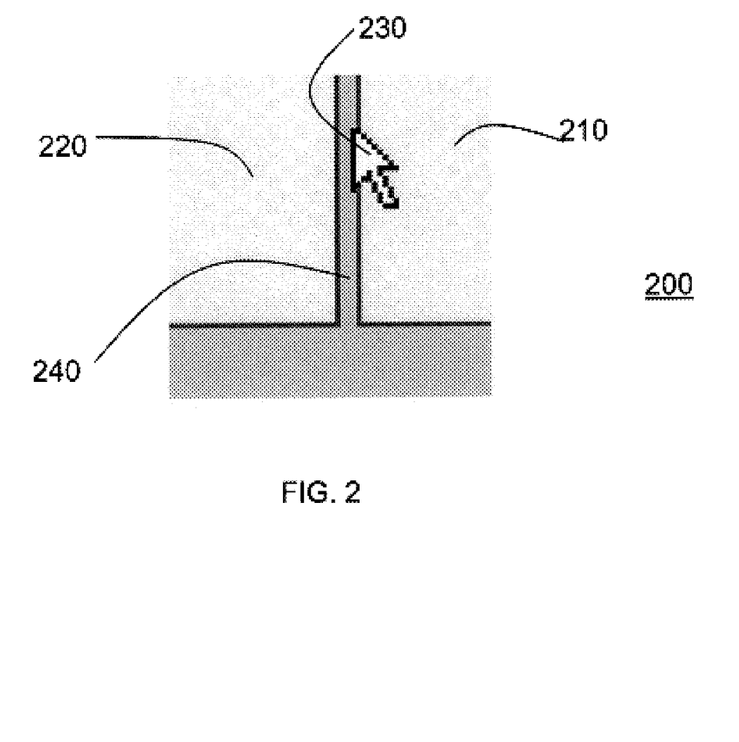
FIG. 2 is an illustration of a selected area within a computer program graphical user interface in accordance with the present invention.
Figure 3:
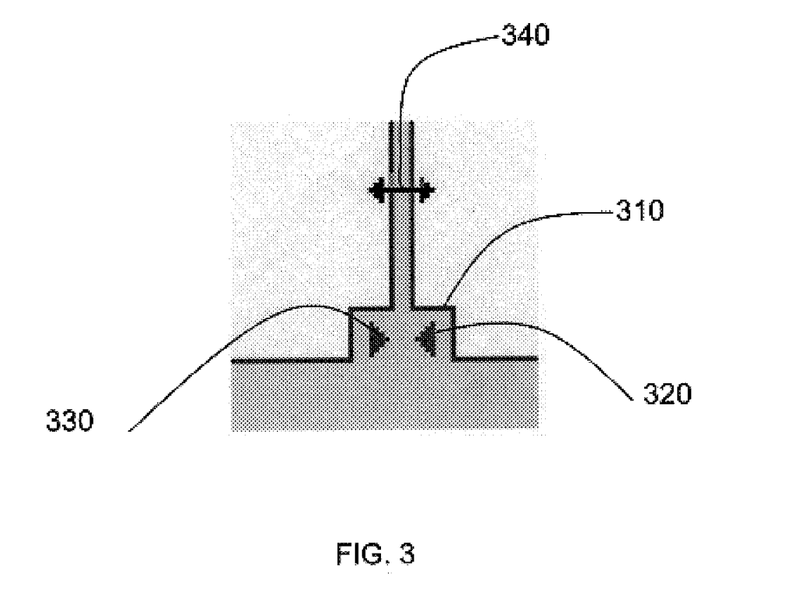
FIG. 3 is an illustration of one embodiment of a selection indicator within the selected area of FIG. 2.

The following detailed description, beginning with the flowchart methodology of FIG. 1 and including the illustrations of FIG. 2 and FIG. 3, pertains to an embodiment of the invention associated with providing snap control icons upon request. Illustrated is a typical GUI 200 showing a right display window 210, a left display window 220, a cursor 230, and a pane between the left and right display windows 240. In one embodiment, a client maneuvers the cursor 230 in a manner known in the art, over the selected area 240 known the pane (block 110). A resident function providing for manual display window manipulation is typical and may provide an icon for implementation. The resident function allows the client to click and drag on the pane in the direction of the display window requiring less area. The cursor 230 can in one embodiment, change to the resident function icon as in FIG. 3. In one embodiment, the selection icon is viewed as a two-headed arrow and lays perpendicular to the pane 340. The resident function and the snap function can become active simultaneously without interference of each other. If the pane has a snap function associated with its location (block 120) then the snap function can provide a selection icon 310. Typically, a function is associated with a location as an address attribute known in the art however; alternative methods of function and location association may be used. The selection icon for the preferred embodiment can be viewable as a cut out portion of the associated display windows, and is illustrated as 310. The selection icon may provide selection indicators such as arrowheads 330, 320, allowing for client control of the snap function. Prior to the visibility of the selection icon 310 and indicators 330, 320, the snap function determines if one of the display windows is already at its maximum viewable area. If one of the display windows is at its maximum viewable area, no selection indicator is needed or provided for that display window (block 140). Another embodiment allows for the selection icon 310 to be displayed at the end of the selected pane (block 150). This provides the client with the ability to place the selection icon 310 and indicators 330, 320 closest to the cursors present location. With all information received as requested by FIG. 1, the snap function displays the selection icon and indicator along side resident function 340 as FIG. 3 illustrates.

Figure 4:
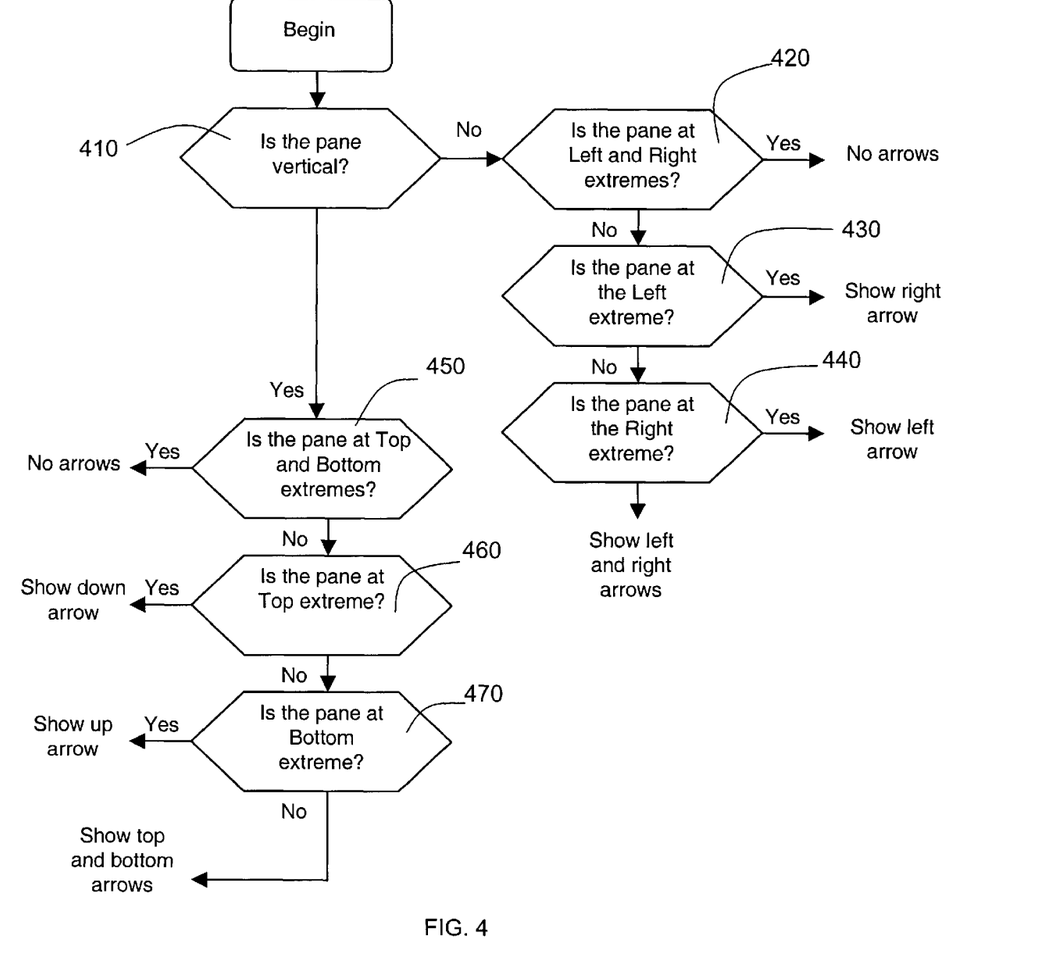
FIG. 4 is a flow diagram of one embodiment of a method for determining vertical and horizontal split screens in accordance with the present invention.

Illustrated in FIG. 4 is a method for the placement of the selection icon 310 as required by block 150. Block 410 requests if a selected is pane vertical. If not, is the display window at the left and right extremes (block 420). If the display window is at its extremes, no arrow is provided for that display window. If not at both extremes, it is determined if the display window at the left extreme (block 430). If yes, the right arrow alone is provided. If not, it is determined if the display window is at the right extreme (block 440). If yes, the left arrow alone is provided. Otherwise, provide both left and right arrows. If the pane is vertical, it is determined if the display window is at the top and bottom extremes (block 450). If yes, the snap function provides no arrows. If the display window is not at both extremes, it is determined if it is at the top extreme (block 460). If yes provide the down arrow alone, otherwise block 470 requests if the display window is at the bottom extreme. If yes, the up arrow is provided otherwise both up and down arrows are provided.

Figure 5:
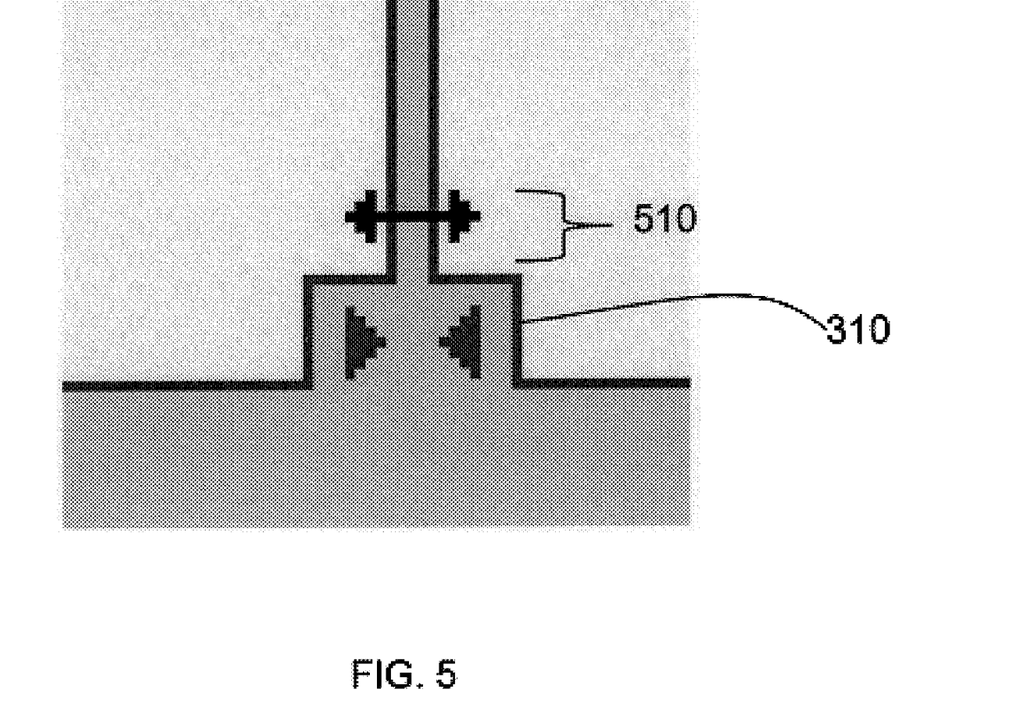
FIG. 5 is an illustration of one embodiment of a selection icon in accordance with the present invention.

FIG. 5 illustrates the distance 510 between the resident function (cursor) and the selection icon 310 providing the selection icon 310 to be located at that end of the pane.

Figure 6:
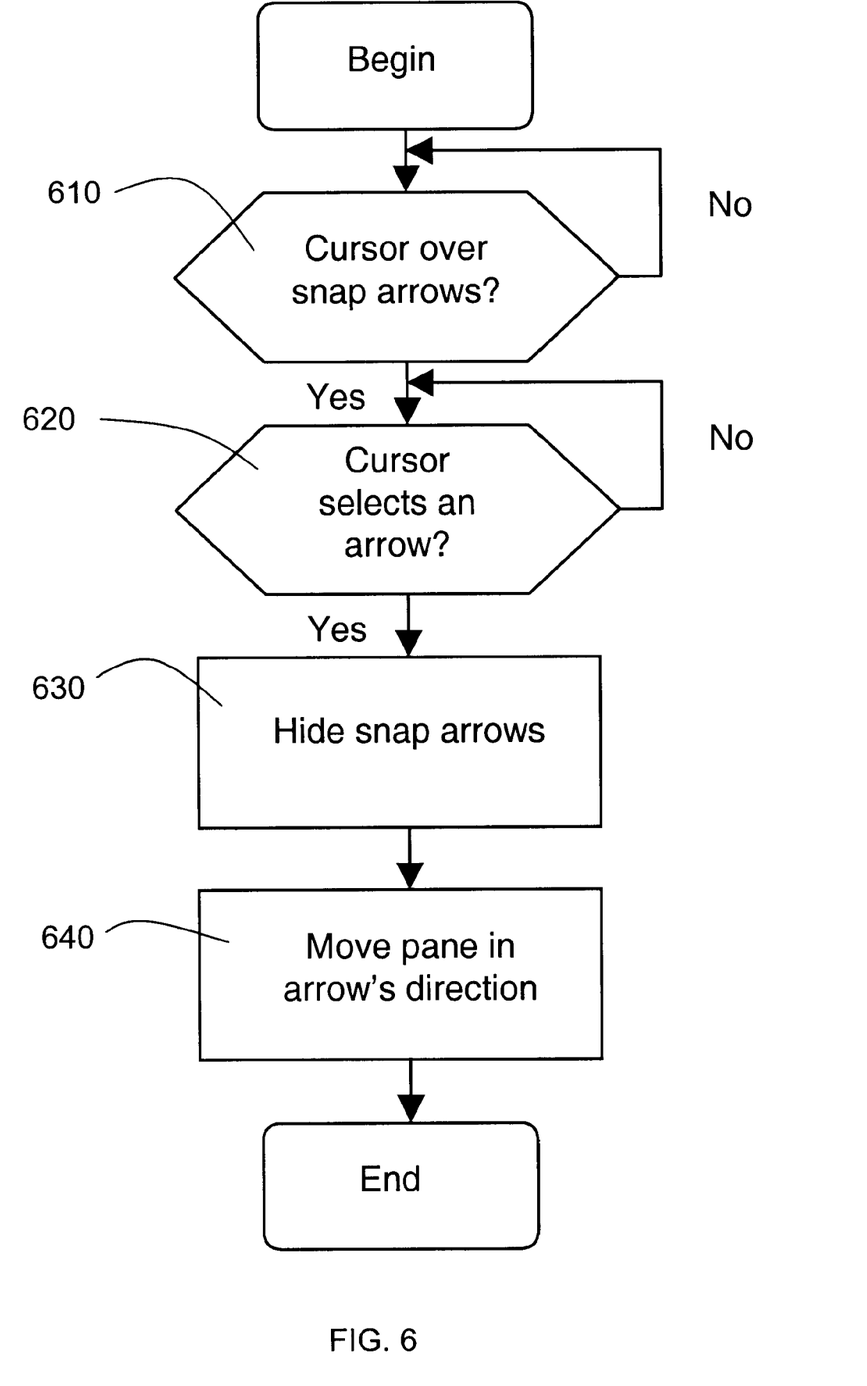
FIG. 6 is a flow diagram of one embodiment of a method for providing selection icon choices in accordance with the present invention.
Figure 7:
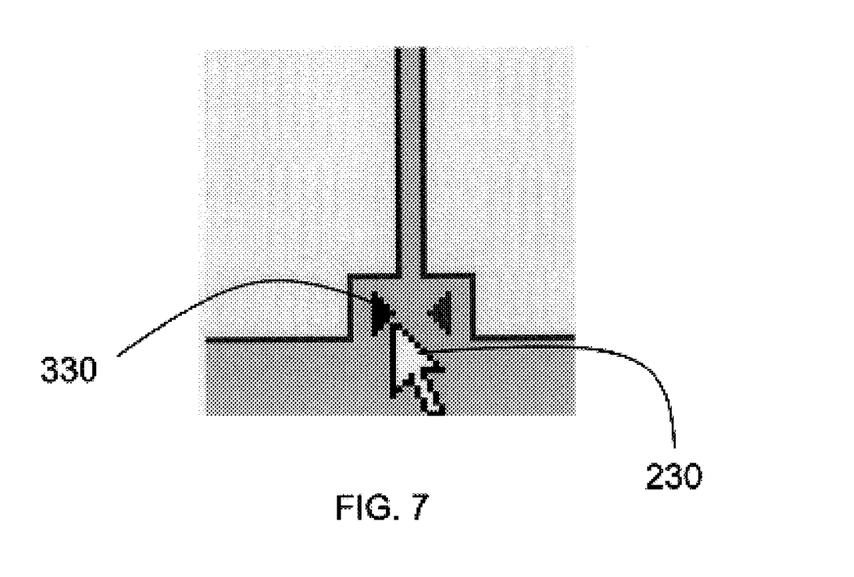
FIG. 7 is an illustration of one embodiment of a selection icon in accordance with the present invention.

FIG. 6 is a flow chart representation of one embodiment of a method for determining selection indicator 330, 320 choices in accordance with the present invention. At block 610, it may be determined if the cursor 230 is over the snap arrows. If the cursor 230 is not over one of the snap arrows, the process remains idle until the cursor 230 is over one of the snap arrows. If the cursor 230 is over the snap arrows, the routine may continue to block 620. FIG. 7 illustrates an example of the selection indicator 330 (arrow) being initiated with the cursor 230 placed over the arrow.

At block 620, it may be determined if the cursor 230 is selecting an arrow. The selection can be performed by a mouse click or alternative similar method known in the art. If the cursor 230 is not selecting an arrow, the process may return to block 610 and wait in an idle state. Alternatively, if the cursor 230 is selecting an arrow, the process continues to block 630. At block 630, the snap arrows may be hidden and the selected display window may be moved in the direction indicated by the arrow (block 640) selected at block 620.

Figure 8:
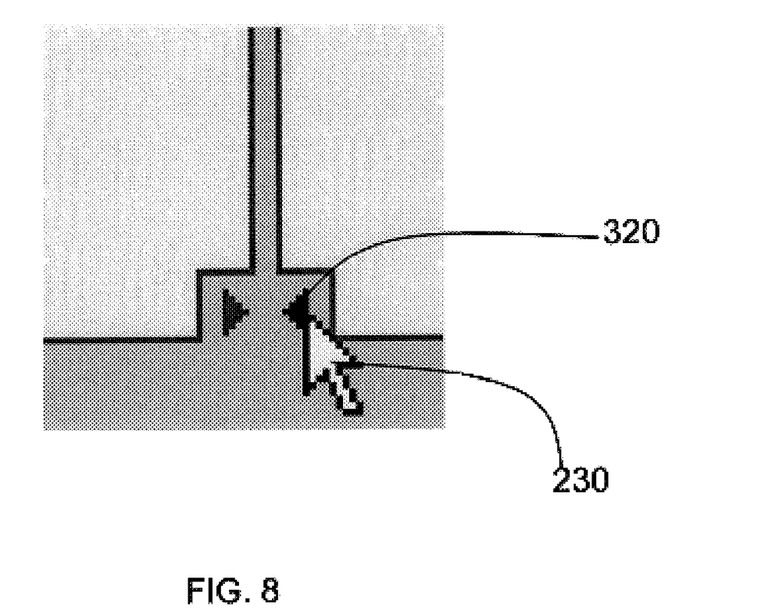
FIG. 8 is an illustration further describing the selection icon of FIG. 7.

FIG. 7 and FIG. 8 are illustrations of a chosen selection icon in accordance with the present invention.

Selection icon 310 may comprise a cursor 230 and a selection indicator 330. In one embodiment of the invention, cursor 230 may be formatted as an arrow or pointer. In the embodiment shown in FIG. 1 cursor 230 may be used to select indicator 330. When indicator 330 is selected, the window may be sized in the direction indicated by selection indicator 330. Alternatively, the window may be sized in another direction. For example, FIG. 8 is a further illustration of the chosen selection icon in FIG. 7.

As seen in FIG. 8, selection icon 310 may also comprise a selection indicator 230 in addition to cursor 230 and selection indicator 220 shown at FIG. 7. In the embodiment shown in FIG. 8 cursor 230 may be used to select indicator 330. When indicator 330 is selected, the window may be sized in the direction indicated by selection indicator 330.

Figure 9:
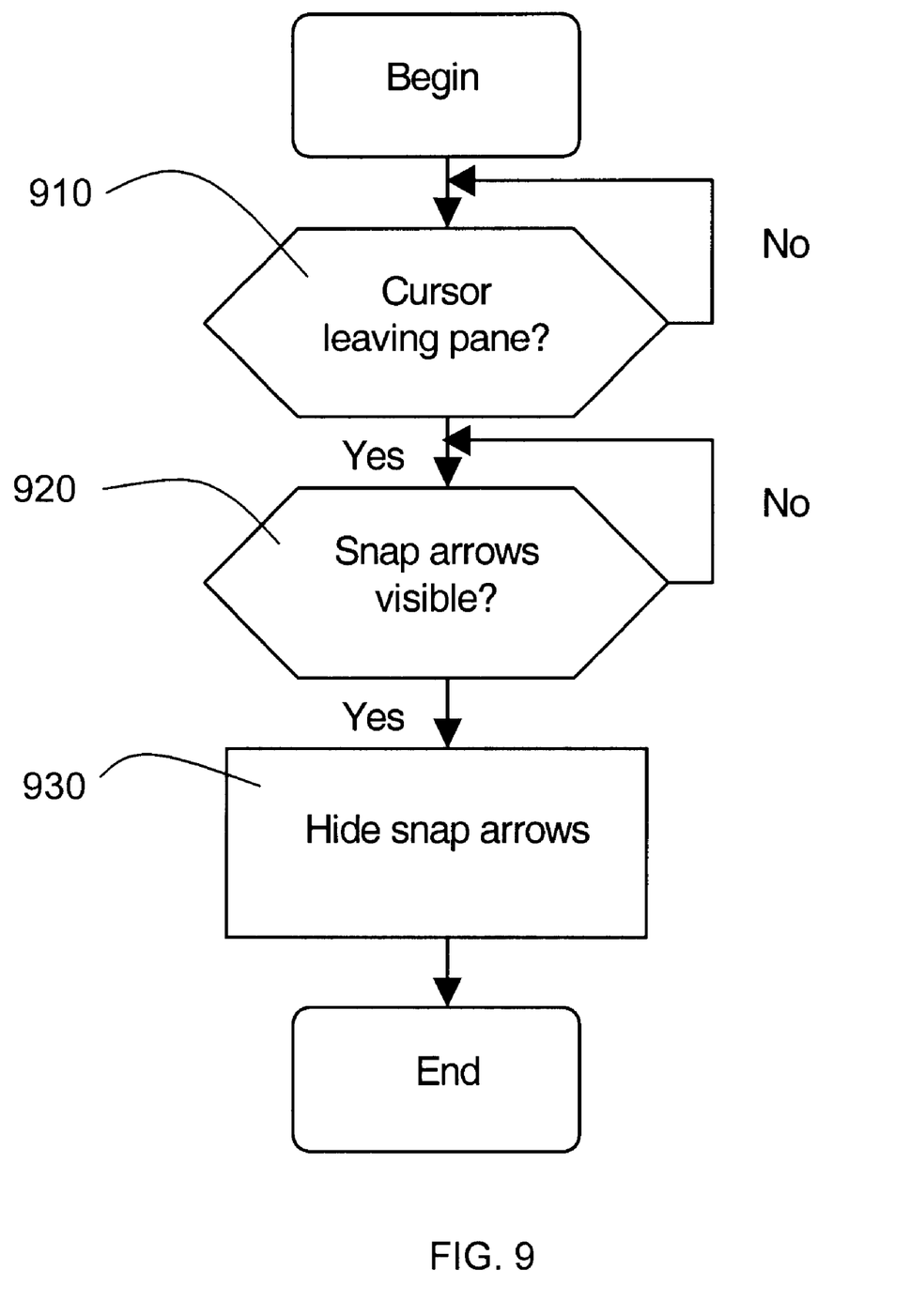
FIG. 9 is a flow diagram of one embodiment of a method for determining selection icon visibility in accordance with the present invention.

FIG. 9 is a flow chart representation of one embodiment of a method for determining selection icon visibility in accordance with the present invention. At block 910, it may be determined if the cursor 230 is leaving the pane. If the cursor 230 is not leaving the pane, the process may return to Beginning and wait. If cursor 230 does leave the pane, the process continues to block 920. At block 920, it may be determined if the selection indicators, also called snap arrows, are visible. If the snap arrows are not visible, the process may return to block 910. If the snap arrows are visible, the process may continue to block 930. At block 930, the snap arrows may be hidden.

The above mentioned actions and like procedures can be created using JAVA, C, C++, HTML, LISP, or other programming languages known in the art. The present invention may be embodied in other specific forms without departing from its spirit or essential characteristics. The described embodiments are to be considered in all respects only as illustrative and not restrictive.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method for providing window snap control for a split screen computer program GUI comprising:

selecting an area between a first and second windows of a computer program;

activating a snap function within the selected area;

displaying a selection icon as a product of the snap function; and selecting an indicator within the selection icon to increase a size of the first window while decreasing a size of the second window.

2. The method of claim 1 wherein the snap function is activated by an address association within the selected area.

3. The method of claim 1 wherein the snap function is activated by positioning a cursor to the area between the first and second windows.

4. The method of claim 3 further comprising:

positioning the cursor at a point away from the selected area to remove the selection icon from display.

5. The method of claim 3 wherein the display of the selection icon is determined as a function of a position of the cursor along the selected area.

6. The method of claim 1 wherein the snap function increases the size of the first window to a predetermined maximum viewable size while decreasing the size of the second window to a predetermined minimum viewable size.

7. The method of claim 1 further comprising:

activating a manual resizing function in unison with the snap function.

8. The method of claim 7 wherein the manual resizing function allows the cursor to resize the first and second windows variably.

9. The method of claim 1 wherein the selection icon is positioned at an endpoint of the selected area.

10. The method of claim 9 wherein the endpoint is at a base end of a vertical area between the first and second windows.

11. The method of claim 9 wherein the endpoint is at a top end of a vertical area between the first and second windows.

12. The method of claim 9 wherein the endpoint is at a left end of a horizontal area between the first and second windows.

13. The method of claim 9 wherein the endpoint is at a right end of a horizontal area between the first and second windows.

14. The method of claim 1 wherein the selection icon is restricted to a one window indication when one window is viewed at a maximum size.

15. A method for providing window snap control for a split screen computer program GUI comprising:

selecting an area between a first and second windows of a computer program;

determining a geometric orientation of the selected area;

activating a snap function within the selected area as a function of the geometric orientation;

displaying a selection icon as a product of the snap function; and selecting an indicator within the selection icon to increase a size of the first window while simultaneously decreasing a size of the second window.

16. A computer program product in a computer usable medium, comprising:

means for selecting an area between a first and second windows of a computer program:

means for activating a snap function within the selected area;

means for displaying a selection icon as a product of the snap function; and means for selecting an indicator within the selection icon to increase a size of the first window while simultaneously decreasing a size of the second window.

17. The program of claim 16 further comprising:

means for positioning a cursor at a point away from the selected area to remove the selection icon from display.

18. The program of claim 17 further comprising:
means for determining a display of the selection icon as a function of a position of the cursor along the selected area.

19. A computer program product in a computer usable medium, comprising:
means for selecting an area between a first and second windows of a computer program;
means for determining a geometric orientation of the area between a first and second windows;
means for activating a snap function within the selected area as a function of the geometric orientation;
means for displaying a selection icon as a product of the snap function; and
means for selecting an indicator within the selection icon to increase a size of the first window while simultaneously decreasing a size of the second window.

20. The program of claim 19 further comprising:
means for activating a manual resizing function in unison with the snap function.

* * * * *